4 Sheets--Sheet 1.

E. & D. C. STOVER.

Wind-Mills.

No. 6,101.

Reissued Oct. 27, 1874.

Witnesses.
James Martin Jr.
J. N. Campbell.

Inventors.
Emanuel Stover
Daniel C. Stover
by
Mason Fenwick & Lawrence
Attys.

THE NORRIS PETERS CO., PHOTO-LITHO., WASHINGTON, D. C.

4 Sheets--Sheet 2.

E. & D. C. STOVER.

Wind-Mills.

No. 6,101.

Reissued Oct. 27, 1874.

Witnesses.
James Martin Jr.
J. N. Campbell

Inventors.
Emanuel Stover
Daniel C. Stover
by Munn & Hancock Lawrence
Attys

THE NORRIS PETERS CO., PHOTO-LITHO., WASHINGTON, D. C.

4 Sheets--Sheet 3.

E. & D. C. STOVER.
Wind-Mills.

No. 6,101.

Reissued Oct. 27, 1874.

Witnesses:
James Martin
J. N. Campbell

Inventors:
Emanuel Stover
Daniel C. Stover
by Munn Fenwick & Lawrence
Attys

THE NORRIS PETERS CO., PHOTO-LITHO., WASHINGTON, D. C.

4 Sheets--Sheet 4.

E. & D. C. STOVER.

Wind-Mills.

No. 6,101.

Reissued Oct. 27, 1874.

Witnesses:
James Martin Jr.
J. N. Campbell

Inventors.
Emanuel Stover
Daniel C. Stover
by
Marcus Fenwick Pennie
Attys

THE NORRIS PETERS CO., PHOTO-LITHO., WASHINGTON, D. C.

UNITED STATES PATENT OFFICE.

EMANUEL STOVER, OF LANARK, AND DANIEL C. STOVER, OF FREEPORT, ILLINOIS.

IMPROVEMENT IN WINDMILLS.

Specification forming part of Letters Patent No. 133,601, dated December 3, 1872; reissue No. 6,101, dated October 27, 1874; application filed September 24, 1874.

*To all whom it may concern:*

Be it known that we, EMANUEL STOVER, of Lanark, in the county of Carroll and State of Illinois, and DANIEL C. STOVER, of Freeport, in the county of Stephenson and State of Illinois, have invented certain new and useful Improvements in Wind-Wheels; and we do hereby declare that the following is a full, clear, and exact description thereof, reference being had to the accompanying drawings making part of this specification, in which—

Figure 1:
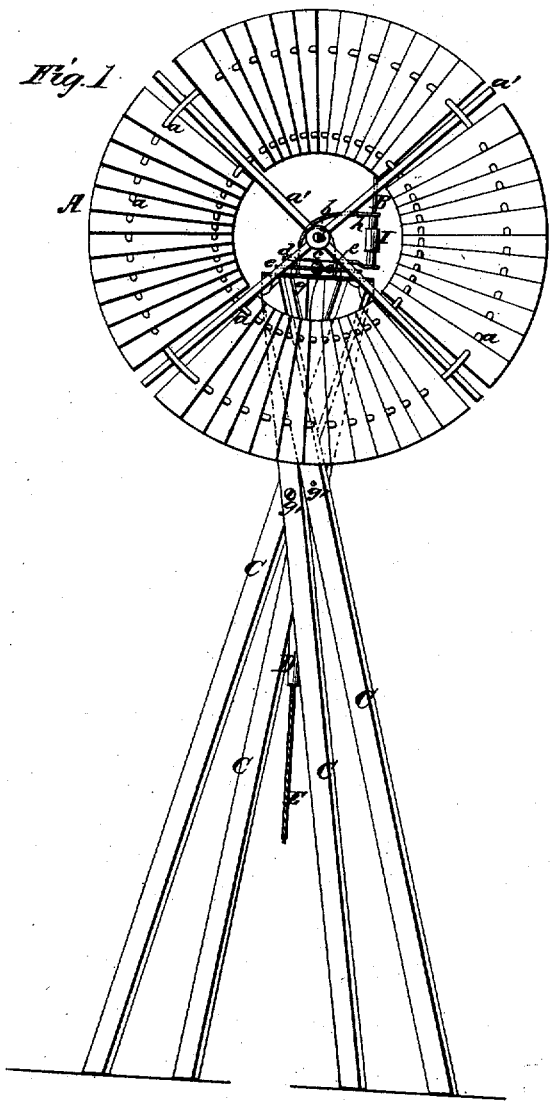
Figures 2, 3:
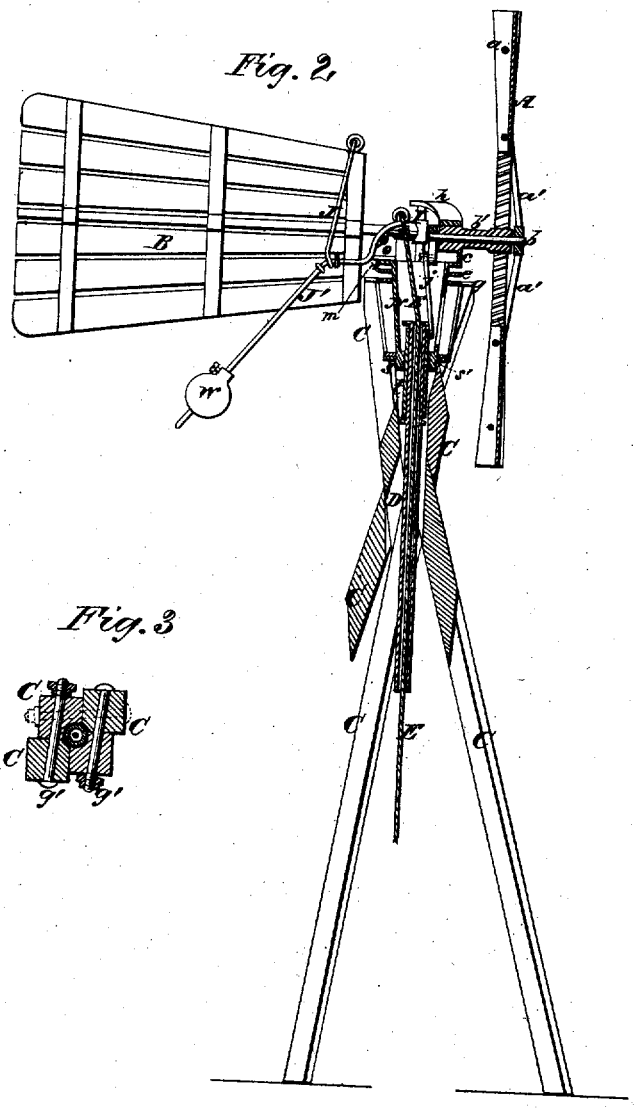
Figure 4:
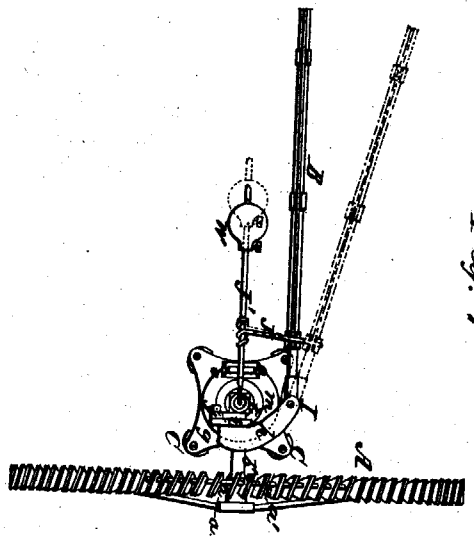
Figure 5:
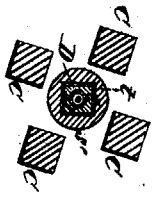
Figure 6:
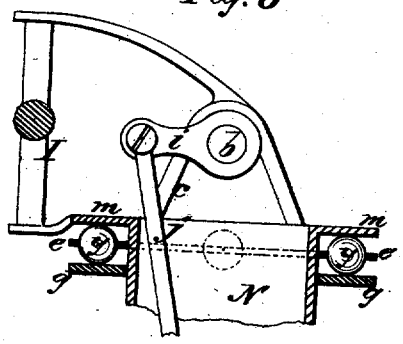
Figure 7:
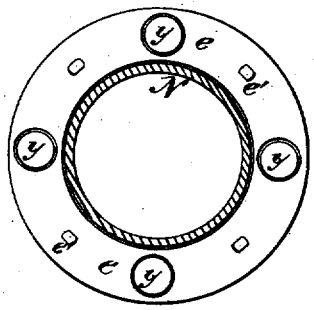

Figure 1, Plate 1, is a front elevation of the wheel. Fig. 2, Plate 2, is a section taken vertically through the tower or frame and wheel. Fig. 3, Plate 2, is a horizontal section through the tower or frame at the joints of the timbers. Fig. 4, Plate 3, is a top view. Fig. 5, Plate 3, is a horizontal section through the tower or frame timbers and lower guide-bearing for the connecting-rod. Fig. 6, Plate 4, is a detailed vertical section of the frustum, turn-table, and other parts; and Fig. 7 is a detailed horizontal section of the turn-table.

Similar letters of reference indicate corresponding parts in the several figures.

This invention relates to certain novel improvements in wind-wheels, the objects of which are, first, to arrange the vane or rudder on one side of the vertical and horizontal axis of this wheel, and to apply to this rudder a regulating-weight in such manner that the wheel will edge to the direction of the wind more or less, according to the force of the wind; second, to employ, in connection with the eccentrically-arranged vane and its regulating-weight, a rope or chain, which passes through the central actuating-shaft of the wheel, and enables the attendant to adjust the vane in a plane parallel to the wind-wheel, and keep it there when it is desired to stop the operation of the wheel; third, to connect the actuating-rod, by a swivel, to a prismatic rod, which works centrally through the lower end of the flange-tube of the tower; fourth, to dish the spokes and wings of the wind-wheel, and apply the said wheel to the tower in such a manner that the weight of this wheel will be brought near the vertical axis of the center of the tower, and thus more equally balance the wheel upon its bearings; fifth, to construct the tower of the wheel of timbers crossed in such manner near their upper ends as to produce a compact, strong, and light tubular structure, which affords a good support for the wheel, and which also admits of the dished wheel being applied on a short shaft, as will be hereinafter explained; and, sixth, to provide means whereby a wind-wheel may have its turn-table bear upon balls which are supported on top of the tower or frame of the windmill.

The following description of our invention will enable others skilled in the art to understand it.

The tower or frame of the wheel is composed of a suitable number (say, four) of strong beams, C, of equal length, which are crossed near their upper ends, and secured together by means of bolts $g'$. The upper ends of the beams of this frame or tower are sawed off in the same plane, and upon them a horizontal cap, $g$, is rigidly secured, said cap serving to tie and hold the beams. The lower ends of these beams are secured down to posts driven into the ground by means of metal shoes. This makes a very strong, compact, light, and cheap frame, each timber of which affords a base-support. This structure also forms a central passage for the guide-tube and other parts, and allows the wheel, which is dished, to revolve very close to the vertical axis of the frame, and hence be governed more easily.

A represents the wind-wheel, the wings of which are rigidly secured to concentric rings $a$ $a$, which are secured to radial spokes $a'$. The entire wheel is dished, as shown in Fig. 2, and applied to a shaft, $b$, which passes through the axis of a horizontal tubular bearing, $b'$, which bearing is supported upon a circular flange, $m$, by means of a block, $c$. The axis of the shaft $b$ intersects the vertical axis of the flange $m$, which is the vertical center about which the wheel turns as it is directed toward or from the direction of the wind.

It will be seen by reference to Figs. 2 and 4 that the plane of the rim or circumference of the wind-wheel A overhangs the bearing $b'$ considerably, owing to the dishing of this wheel, the effect of which is to throw the weight of the wheel nearer the vertical axis of the tower than is the case with a wheel not dished, and thus prevent undue strain and friction, the cross or hour-glass form of the tower permitting the perimeter of the wheel to revolve in a plane which is far within the base of the tower, thus allowing a short shaft to be used for the wheel to revolve upon.

The flange *m* is formed on the upper end of a tube, N, the form of which we prefer shall be an inverted conical frustum. It is supported on the cap *g* by means of anti-friction balls *y*, which are kept in their places between the flange and cap by means of a ring, *e*, said ring being kept horizontal by vertical lugs *e'*.

By reference to Figs. 6 and 7, Plate 4, it will be seen that the ring *e* is perforated to receive the anti-friction balls *y*, and thus keep them in their places between the cap *g* and the flange or turn-table *m*. The ring *e* enables us to use balls instead of wheels, and it also keeps the balls separated. The balls obviate the necessity of frequent lubrication of the turn-table bearing, and also allow the conical frustum to rotate freely. The lower end *s'* of the conical frustum is guided by a plate or step, *s*, which is secured in the crotch of the frame C, and which, by means of a flange or collar on the portion *s'*, keeps the conical frustum down in its place, while the cap *g* keeps it vertically in place. Through the portion *s* a prismatic shaft, *t*, passes vertically, which is connected by a pitman, *j*, to a crank, *i*, on the wheel-shaft *b*. This shaft *t* turns with the conical frustum, and is free to be moved up and down by the revolution of the crank *i*. Through this prismatic shaft *t* passes freely the upper portion of a hollow shaft, D, which is connected to the shaft *t* by flanges above and below it, so as to move up and down with it, but not to turn with it. The shaft D is the actuating-shaft of a pump or other machine which it is desired to operate.

It will be seen that the prismatic shaft and conical frustum turn about their vertical axis with the wind-wheel A, and that the actuating-shaft receives an up-and-down motion, but does not rotate with said parts. The vane or rudder B has a short pivotal T-head formed on its rod, which is pivoted in an upright position between an overhanging extension, *h*, of the block *c* and a lug, which is formed on the periphery of the flange *m* of the conical frustum N. The pivotal connection of the vane is thus eccentric to the vertical and horizontal axes of motion of the wind-wheel—that is to say, the vane is arranged on one side of the vertical center of the conical frustum N, and connected thereto, so as to turn with it and the wheel A. J' represents a bent lever, which is pivoted between two standards, *o*, rising from the flange *m*. The lever J' has a weight, *w*, adjustably applied to it, and, by means of a link, J, this loaded lever is connected to the upper inner angle of the vane, as shown in Figs. 2 and 4. To the inner end of the loaded lever J' a rope or chain, E, is connected, which passes down through the actuating-shaft D, and is drawn upon by the attendant when he desires to stop the revolution of the wheel A. By drawing down the chain E until the vane B is in a plane parallel to the wheel A, and then fastening the chain, the wheel A will be kept edgewise to the wind, and will consequently not rotate about its horizontal axis.

It will be seen from the above description, first, that when the weight *w* is properly adjusted on its vertically-vibrating lever J, so as to hold the vane B in a position at right angles to the plane of the wheel A under a light breeze, this wheel will present a full broadside to the wind; that, as the force of the wind increases, the angle of the vane, with respect to the plane of the wheel, will become more or less acute, which will, in like proportion reduce the power of the wheel; or, in other words, the wheel will be edged to the wind more or less as the force of the wind increases. Second, that the horizontal axis of the wheel A is arranged radially with the center of the frame or tower C, while the vane is arranged eccentrically. This allows the power of the wheel to be transmitted more directly to the actuating-shaft D than when the vane and wheel are arranged in the reverse order—that is, the wheel-shaft set eccentric to the axis of the tower, and the vane radial with the central axis thereof. Third, that the weight which resists the action of the wind against the vane B is adjustable on its lever, and may be set so as to increase or diminish the power of the wheel, as may be desired. Fourth, that by simply drawing down and holding the chain E, the vane B can be retained in such a position with respect to the wheel A as will prevent the wind from having any influence on this wheel.

We do not claim a turn-table of a wind-wheel supported upon wheels, as wheels are liable to bind laterally; nor do we claim a turn-table of a wind-wheel supported upon rollers, as rollers are liable to bind laterally; but Having described our invention, what we claim as new, and desire to secure by Letters Patent, is—

1. The tower for a wind-wheel, formed of a series of beams crossed and fastened together at top and at the point of crossing, so as to make a strong, compact, and light structure of tubular form, and which is broader at its base and on its tip than it is at the point where the beams are crossed and united, substantially as set forth.

2. The combination of the tower, formed of continuous beams C C, crossed so as to form an open tubular structure, and the wind-wheel with its frame and wings dished and inclining toward the center of the tower, substantially in the manner and for the purpose described.

3. The horizontally-swinging vane B, applied eccentrically to the horizontally-turning tube of a wind-wheel, whose shaft is radial with the axis of the tower, substantially as described.

4. The weighted rod J′ and the link J applied to a vane, B, which is pivoted to one side of the vertical axis of the tower, and also to one side of the horizontal axis of the wind-wheel, substantially in the manner and for the purpose described.

5. The flange *m* and bracket *h*, in combination with the T-arm of the vane, for the purpose of setting and sustaining the vane with its face square to the wind, and in a position eccentric to the axis of the tower, and also allowing the vane to move horizontally independently of the wheel, substantially as described.

6. The eccentrically-hinged vane B, link J, weighted rod J′, and stop-chain or cord E, applied in connection with a wind-wheel whose axis is radial with the axis of the tower, substantially as and for the purpose set forth.

7. The hollow actuating-rod D, connected by a swivel to the prismatic rod *t*, working centrally through the lower end of the tube of the tower, substantially as and for the purpose set forth.

8. A wind-wheel having its turn-table bearing upon balls, which are supported on the tower or frame of the wind-mill, substantially as described.

EMANUEL STOVER.
DANIEL C. STOVER.

Witnesses:
HENRY M. BURNUM,
W. C. ENDSLEY.